(12) United States Patent
Jester et al.

(10) Patent No.: US 10,709,116 B1
(45) Date of Patent: Jul. 14, 2020

(54) DIVISION BOARD HANGING FEEDER

(71) Applicants: Kevin D. Jester, Mims, FL (US);
Pratima Jester, Mims, FL (US)

(72) Inventors: Kevin D. Jester, Mims, FL (US);
Pratima Jester, Mims, FL (US)

( * ) Notice: Subject to any disclaimer, the term of this patent is extended or adjusted under 35 U.S.C. 154(b) by 435 days.

(21) Appl. No.: 15/581,622

(22) Filed: Apr. 28, 2017

(51) Int. Cl.
*A01K 29/00* (2006.01)
*A01K 53/00* (2006.01)
*A01K 47/06* (2006.01)

(52) U.S. Cl.
CPC ............. *A01K 53/00* (2013.01); *A01K 47/06* (2013.01)

(58) Field of Classification Search
CPC ........ A01K 53/00; A01K 47/06; A01K 47/00; A01K 67/033; A01K 67/0333; A01K 67/0335; A01K 67/0336; A01K 67/0337; A01K 67/0339; A01K 1/0356; A01K 5/01; A01K 5/0107; A01K 31/005; A01K 39/0206
See application file for complete search history.

(56) References Cited

U.S. PATENT DOCUMENTS

| | | |
|---|---|---|
| 41,711 A | 2/1864 | Markham |
| 61,514 A | 1/1867 | Buel |
| 67,680 A | 8/1867 | Slusser |
| 149,578 A | 4/1874 | Cuplin |
| 200,506 A | 2/1878 | Carter |
| 204,767 A | 6/1878 | Shuck |
| 784,072 A * | 3/1905 | Roberts ................. A01K 53/00 449/11 |
| 905,706 A | 12/1908 | Johnson |
| 1,064,779 A | 6/1913 | Schamu |
| 1,116,923 A | 11/1914 | Rahn |
| 1,353,310 A | 9/1920 | Bonnett |
| 1,369,190 A | 2/1921 | Podhajny |
| 1,426,701 A | 8/1922 | Achenbach |
| 1,502,278 A | 7/1924 | Stevens |
| 2,001,463 A | 5/1935 | Kehrfe |
| 2,446,346 A | 8/1948 | Stoller |
| 2,496,285 A | 2/1950 | Goebel |
| 2,539,633 A | 1/1951 | Morrill |
| 2,611,140 A | 9/1952 | Goble |

(Continued)

FOREIGN PATENT DOCUMENTS

| | | |
|---|---|---|
| FR | 321007 A | 12/1902 |
| FR | 794209 A | 2/1936 |

(Continued)

OTHER PUBLICATIONS

American Bee Journal, The Beekeeper's Companion Since 1861, vol. 156 No. 12, Dec. 2016, 2 pages.
Mannlake We Know Bees, An Employee Owned Company, 2016, 5 pages.

*Primary Examiner* — Trinh T Nguyen
(74) *Attorney, Agent, or Firm* — Martin IP Law Group; C. Richard Martin

(57) ABSTRACT

Systems, devices, and methods for providing hanging feeder frame for a hive box, with a clear lid for monitoring food syrup inside with the lid being easily removed or attached by clip edges to the hanging feeder frame. The hanging feeder can include uniform diameter tubes that attach to inner sides of the frame to add stability to the frame. The hanging feeder can include a float system in the tubes to restrict access to the syrup so that the bees have a safe and easy access to their food supplies.

20 Claims, 20 Drawing Sheets

(56) References Cited

U.S. PATENT DOCUMENTS

| | | |
|---|---|---|
| 3,343,186 A | 9/1967 | Dunand |
| 3,478,722 A | 11/1969 | Falcone et al. |
| 3,526,913 A | 9/1970 | Warner |
| 3,704,471 A | 12/1972 | Bielby |
| 3,776,195 A | 12/1973 | Willinger |
| 3,835,487 A | 9/1974 | Grigg |
| 4,053,101 A | 10/1977 | Hart, Jr. |
| 4,135,265 A | 1/1979 | Van De Kerkof |
| 4,214,329 A | 7/1980 | Kozlowicz |
| 4,233,941 A | 11/1980 | Webster |
| 4,250,581 A | 2/1981 | Kindall |
| 4,322,862 A | 4/1982 | Beuthling |
| 4,333,189 A | 6/1982 | Mentzer et al. |
| 4,497,433 A | 2/1985 | Wischusen, III |
| 4,524,476 A | 6/1985 | Adams, IV |
| 5,211,597 A * | 5/1993 | Scott .................. A01K 47/00 449/27 |
| 5,348,511 A | 9/1994 | Gross et al. |
| 5,461,822 A | 10/1995 | Green et al. |
| 5,509,846 A | 4/1996 | Kueneman et al. |
| 5,983,557 A | 11/1999 | Perich et al. |
| 6,042,453 A | 3/2000 | Varni et al. |
| 8,475,227 B2 | 7/2013 | Volby |
| 8,764,512 B1 * | 7/2014 | Watson .................. A01K 47/06 449/15 |
| 8,814,630 B2 | 8/2014 | Rittberger |
| 2006/0185602 A1 | 8/2006 | Nock |
| 2007/0145107 A1 | 6/2007 | Figueroa |
| 2008/0307695 A1 | 12/2008 | Bernard |
| 2014/0335760 A1 | 11/2014 | Huvermann et al. |
| 2015/0028090 A1 | 1/2015 | Justice |
| 2015/0140897 A1 | 5/2015 | Linder et al. |
| 2016/0157467 A1 | 6/2016 | Banta |
| 2017/0332608 A1 | 11/2017 | Pedersen |

FOREIGN PATENT DOCUMENTS

| | | | |
|---|---|---|---|
| FR | 2342654 | 9/1977 | |
| FR | 2578389 | 9/1986 | |
| FR | 2585215 A1 | 1/1987 | |
| FR | 2597715 A1 | 10/1987 | |
| FR | 2688381 | 9/1993 | |
| FR | 2839613 | 11/2003 | |
| FR | 2859598 | 3/2005 | |
| GB | 462197 | 3/1937 | |
| GB | 581253 A | 10/1946 | |
| GB | 595413 | * 12/1947 | ............ A01K 53/00 |
| GB | 714468 A | 8/1954 | |
| GB | 907963 A | 10/1962 | |
| KR | 101400740 | 5/2014 | |
| KR | 101667628 | 10/2016 | |
| WO | WO-2007133056 A1 | * 11/2007 | ............ A01K 47/00 |

* cited by examiner

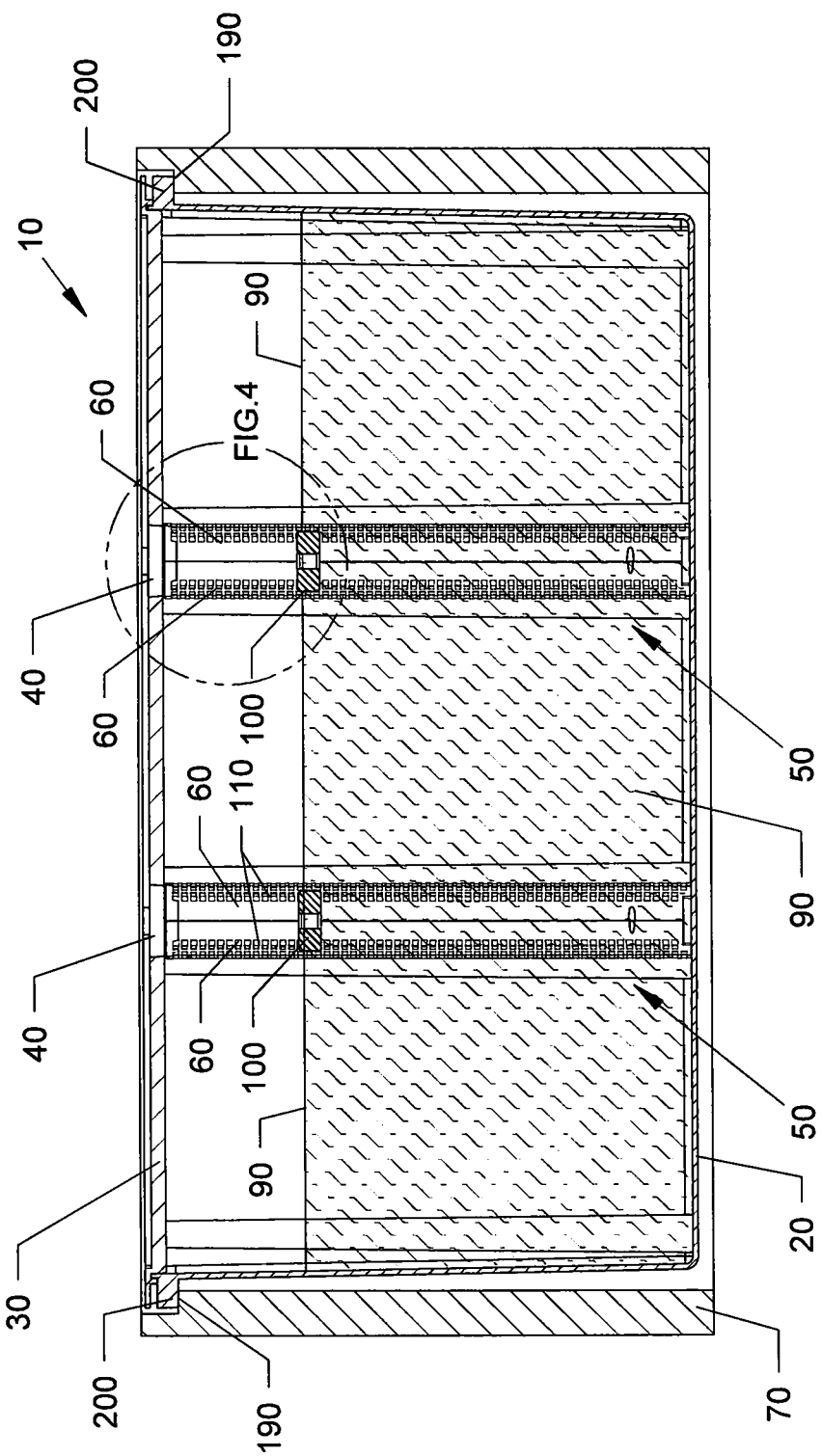

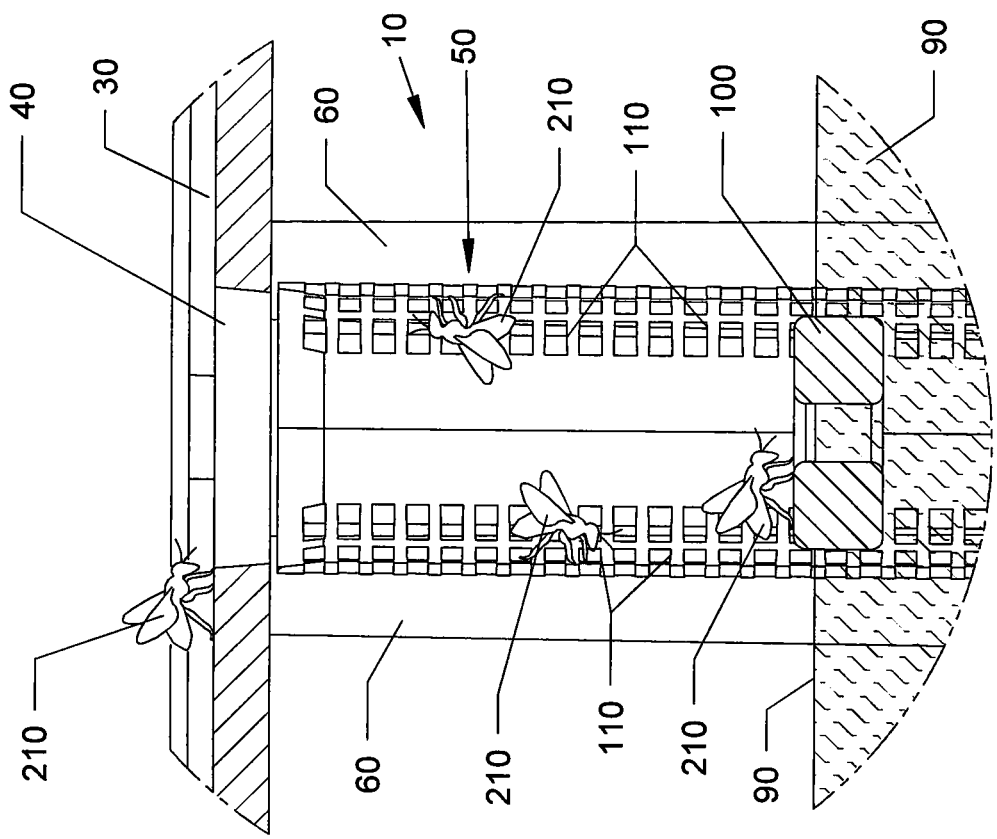

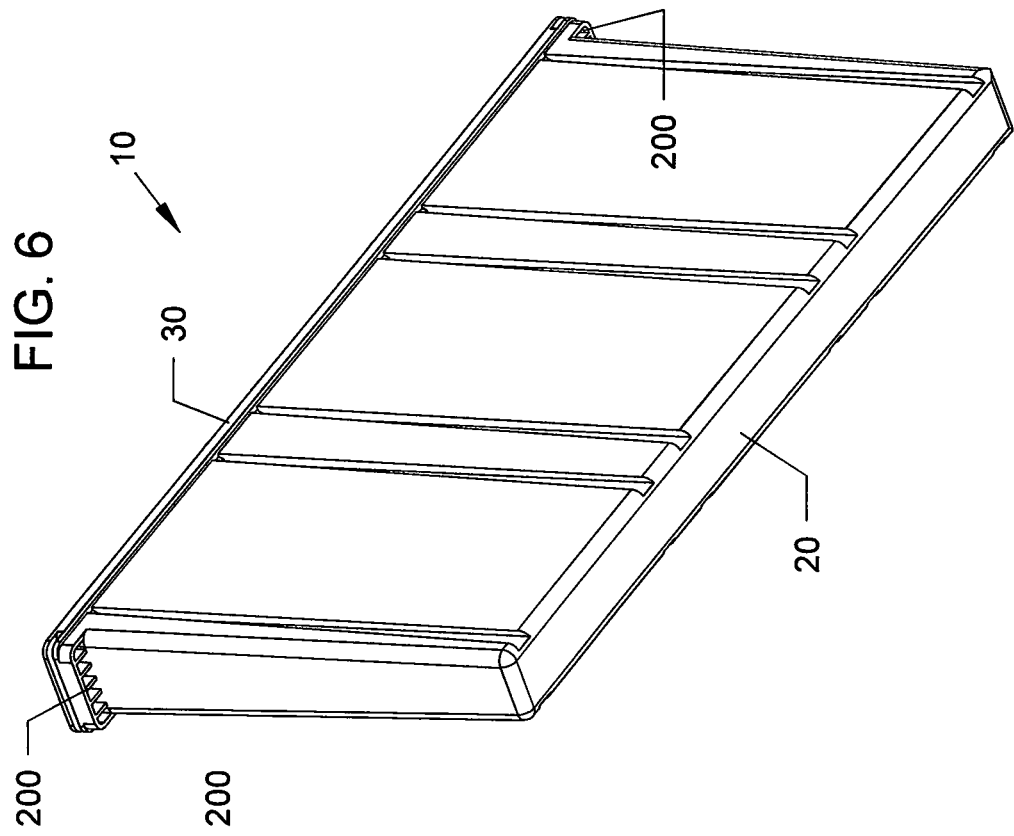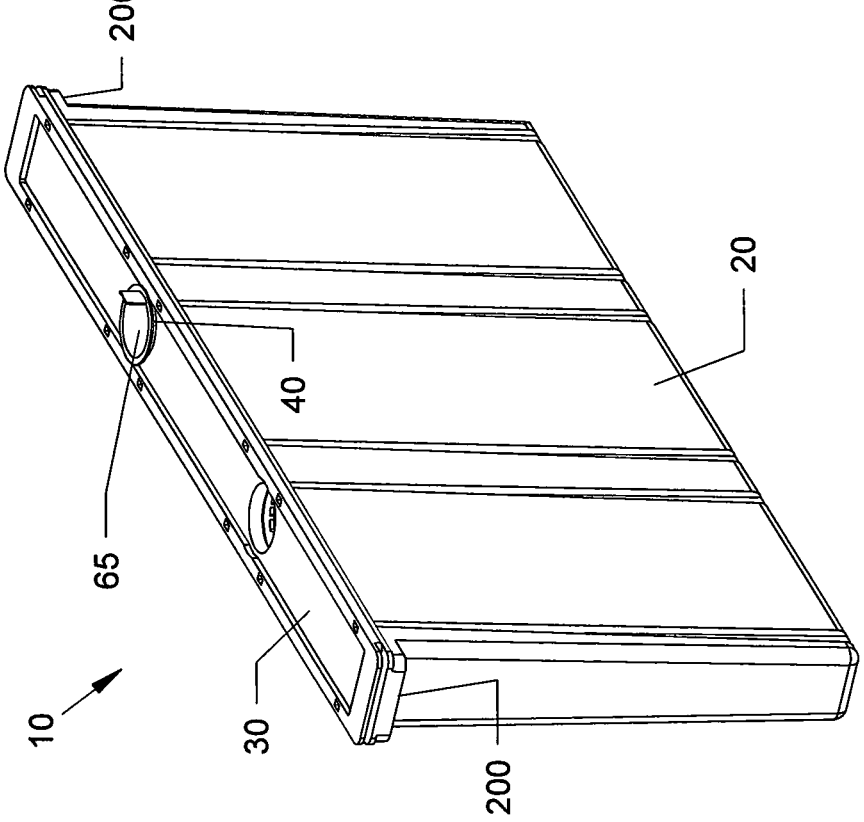

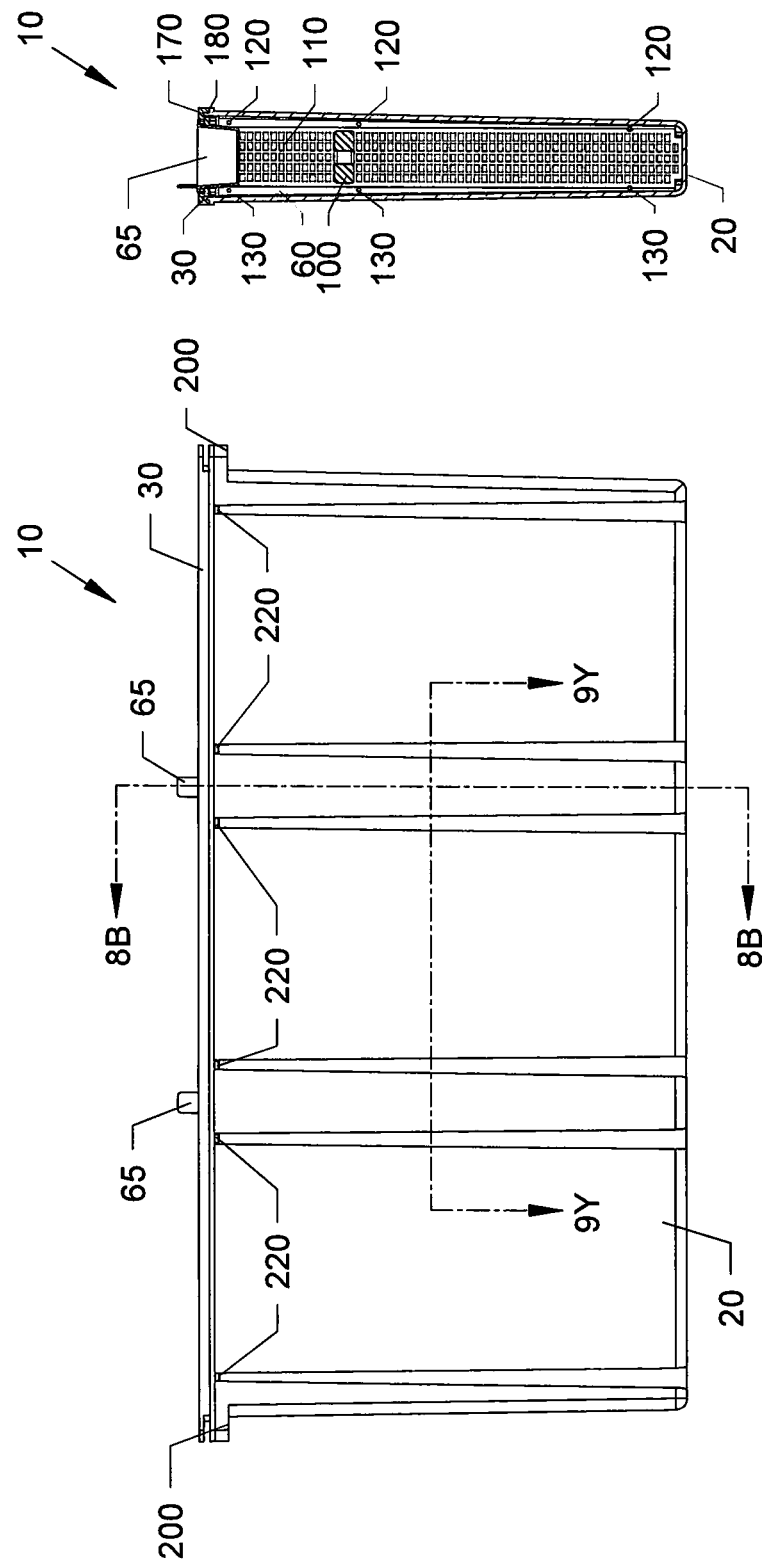

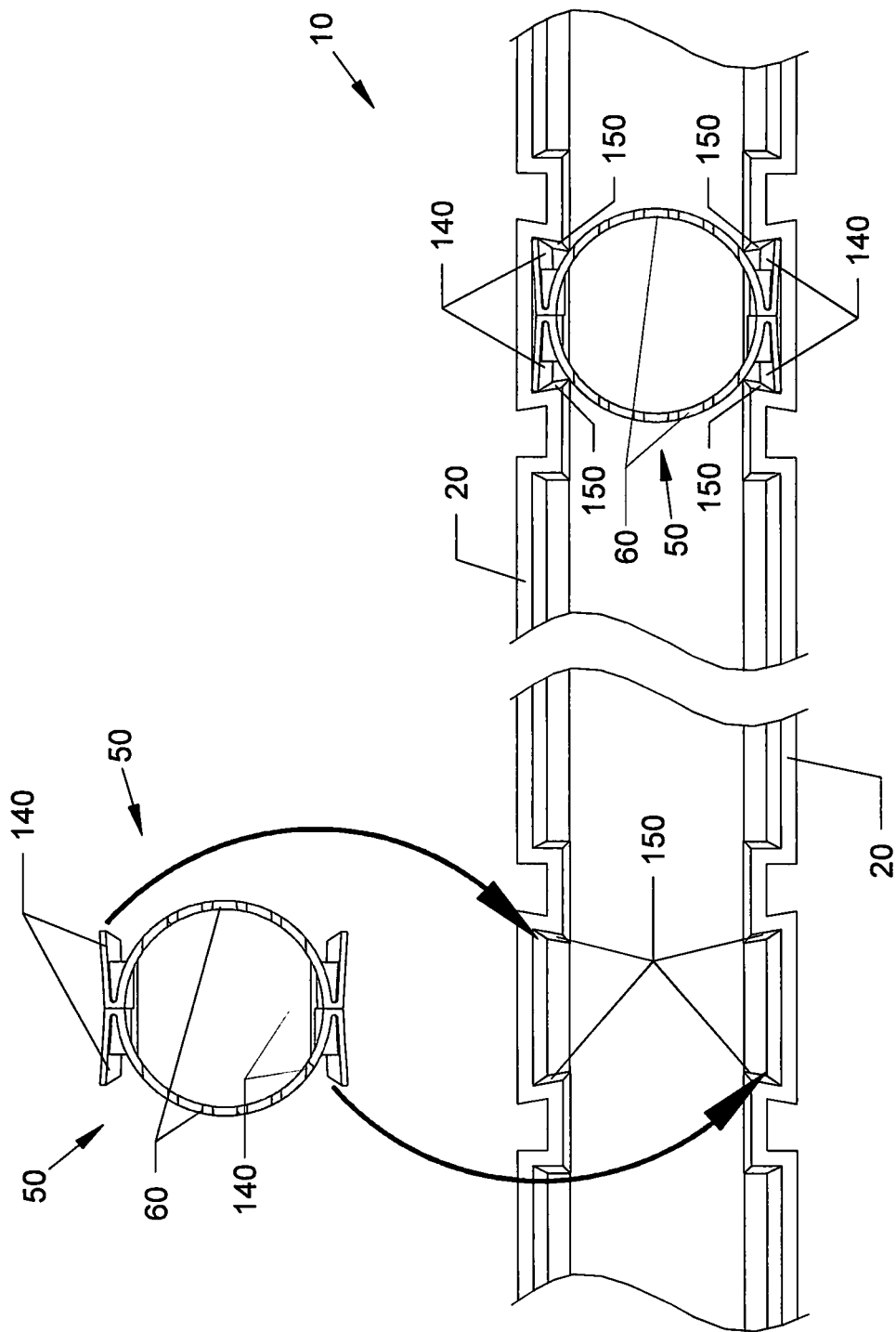

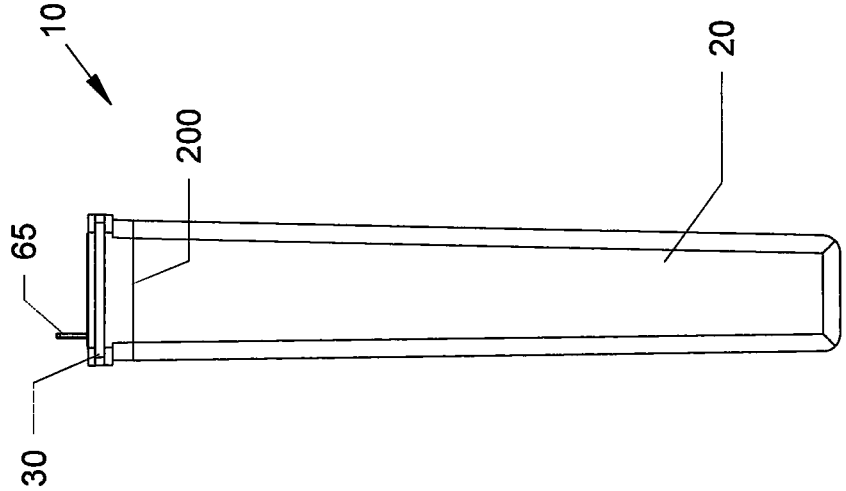
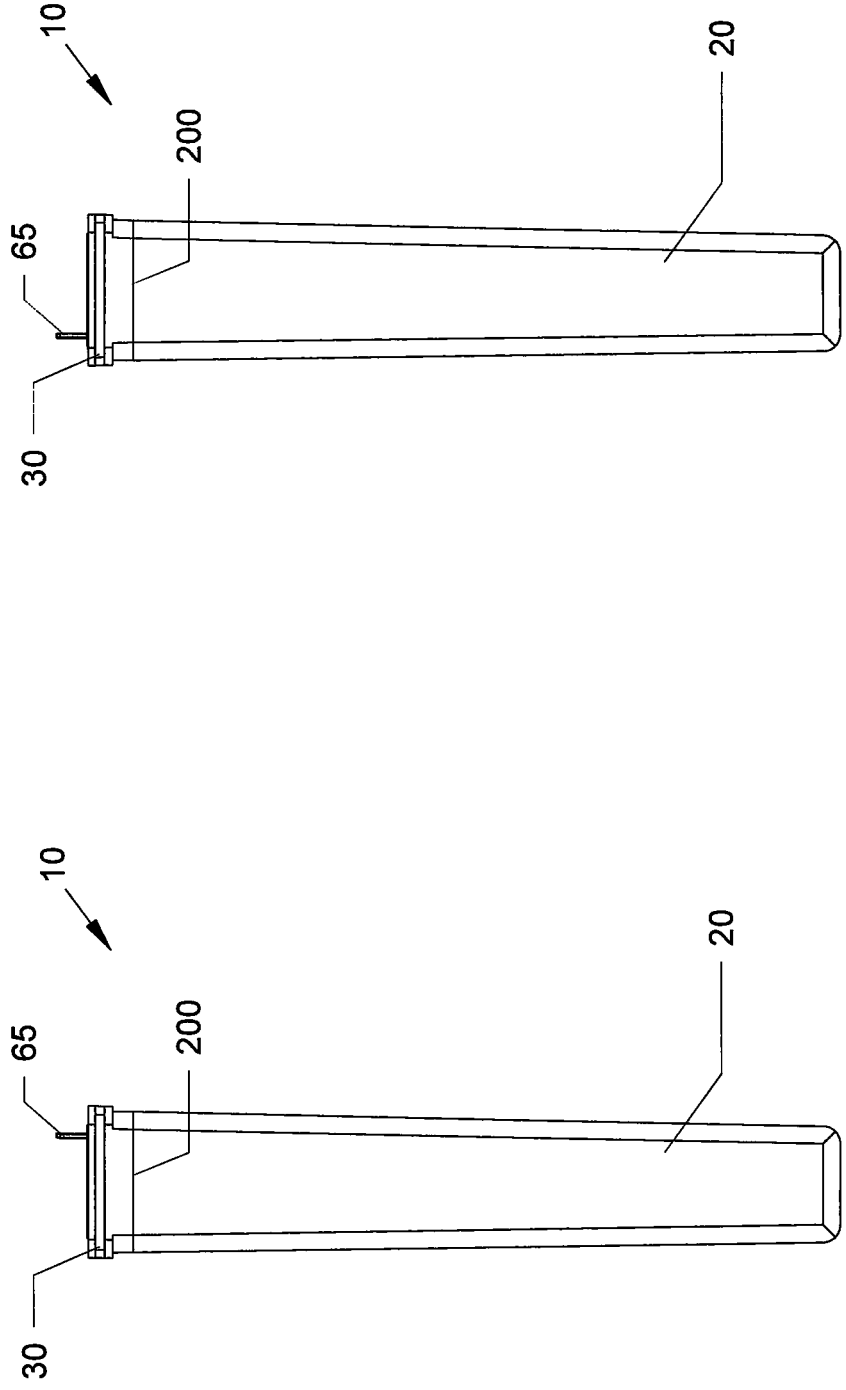

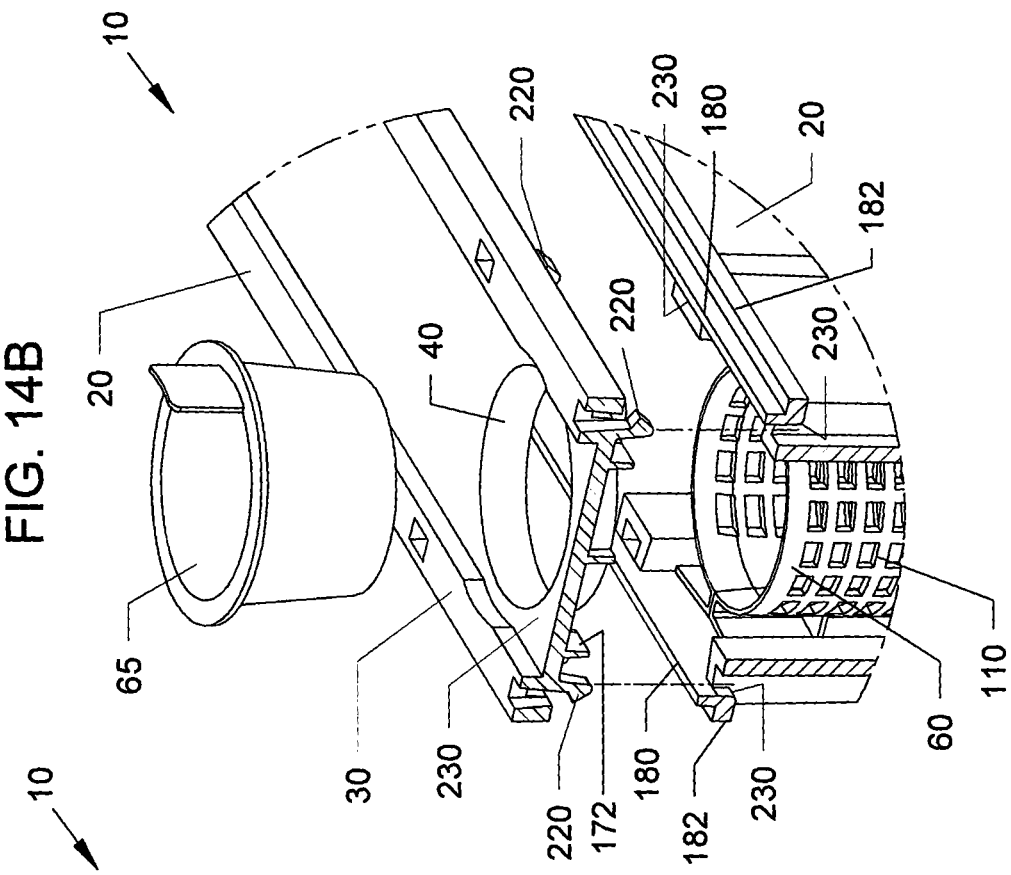
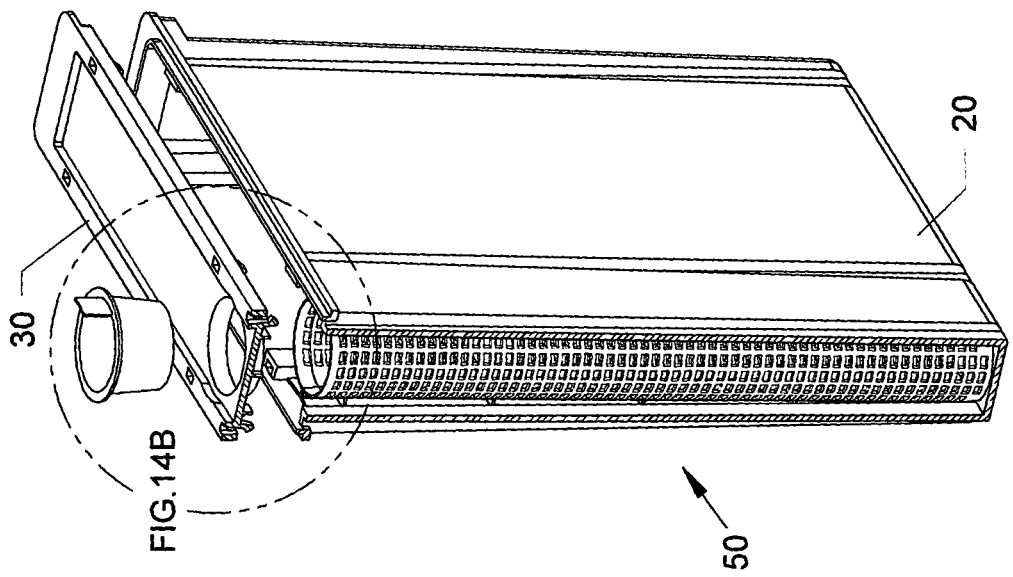

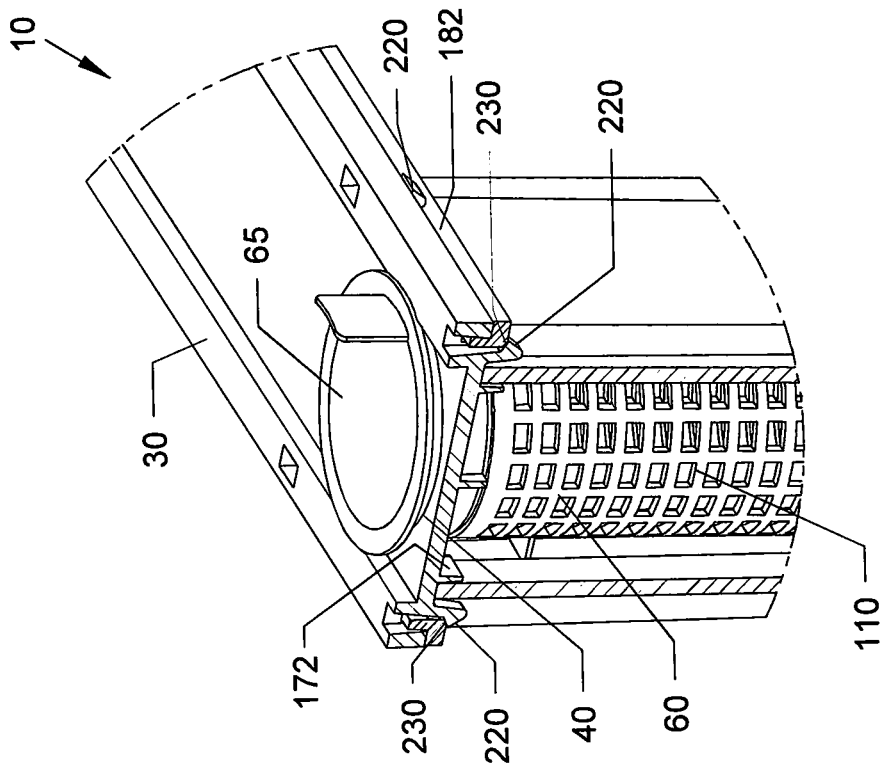
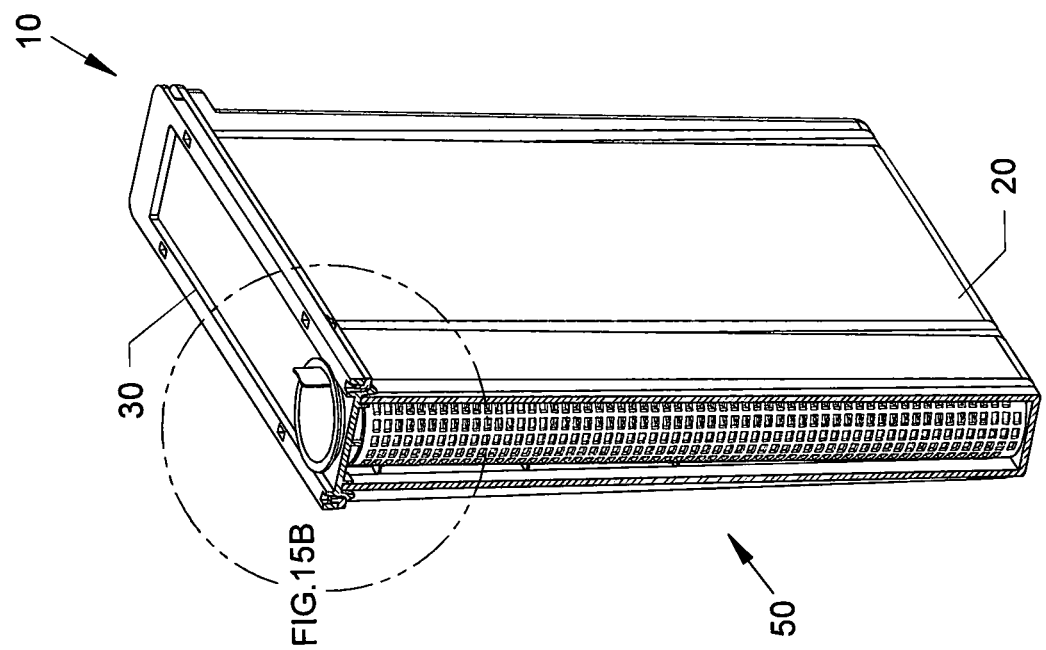
FIG. 15B
FIG. 15A

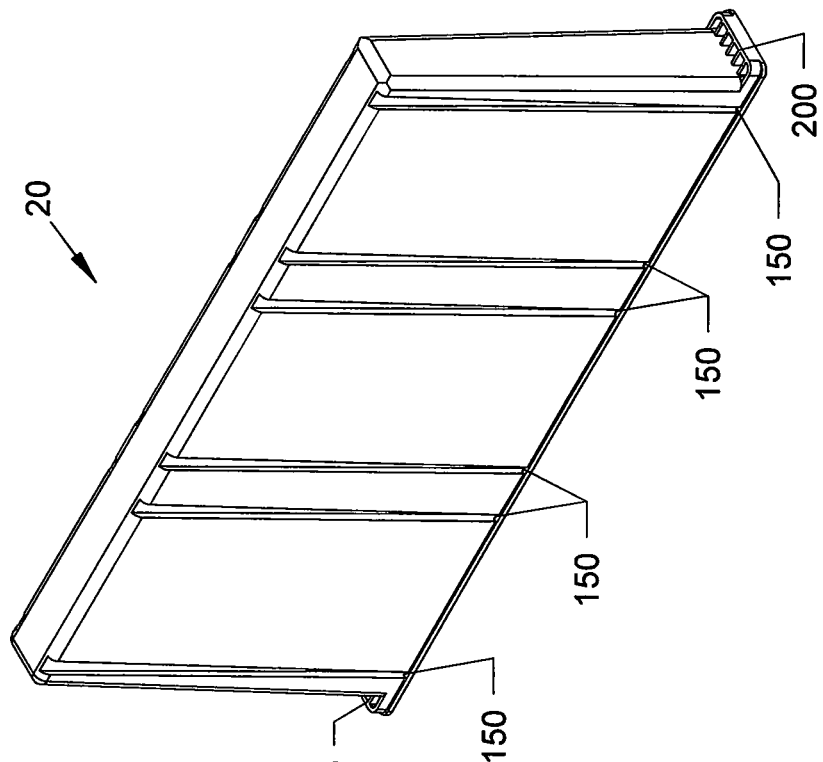
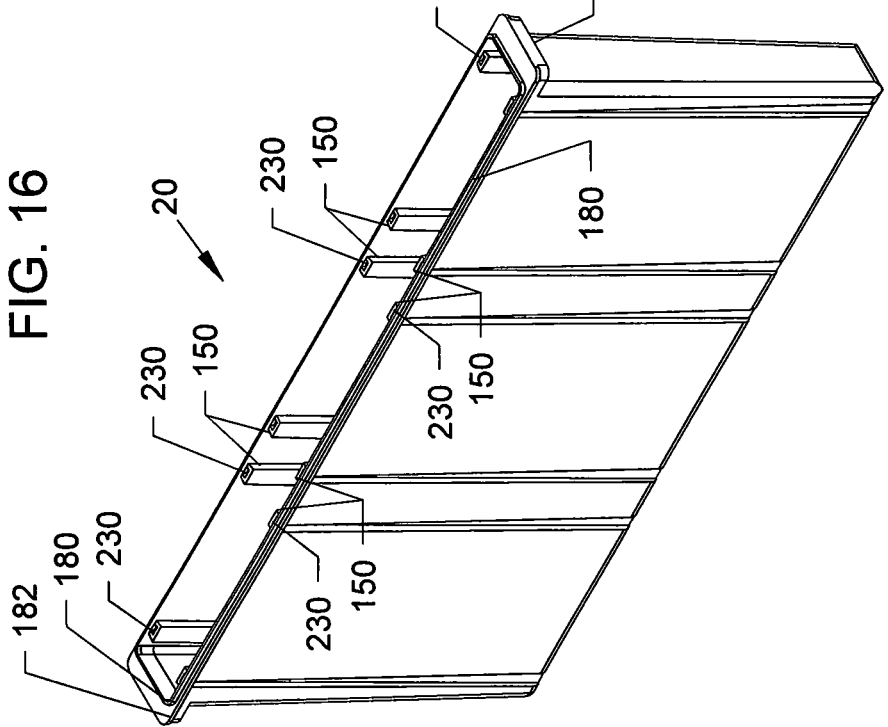

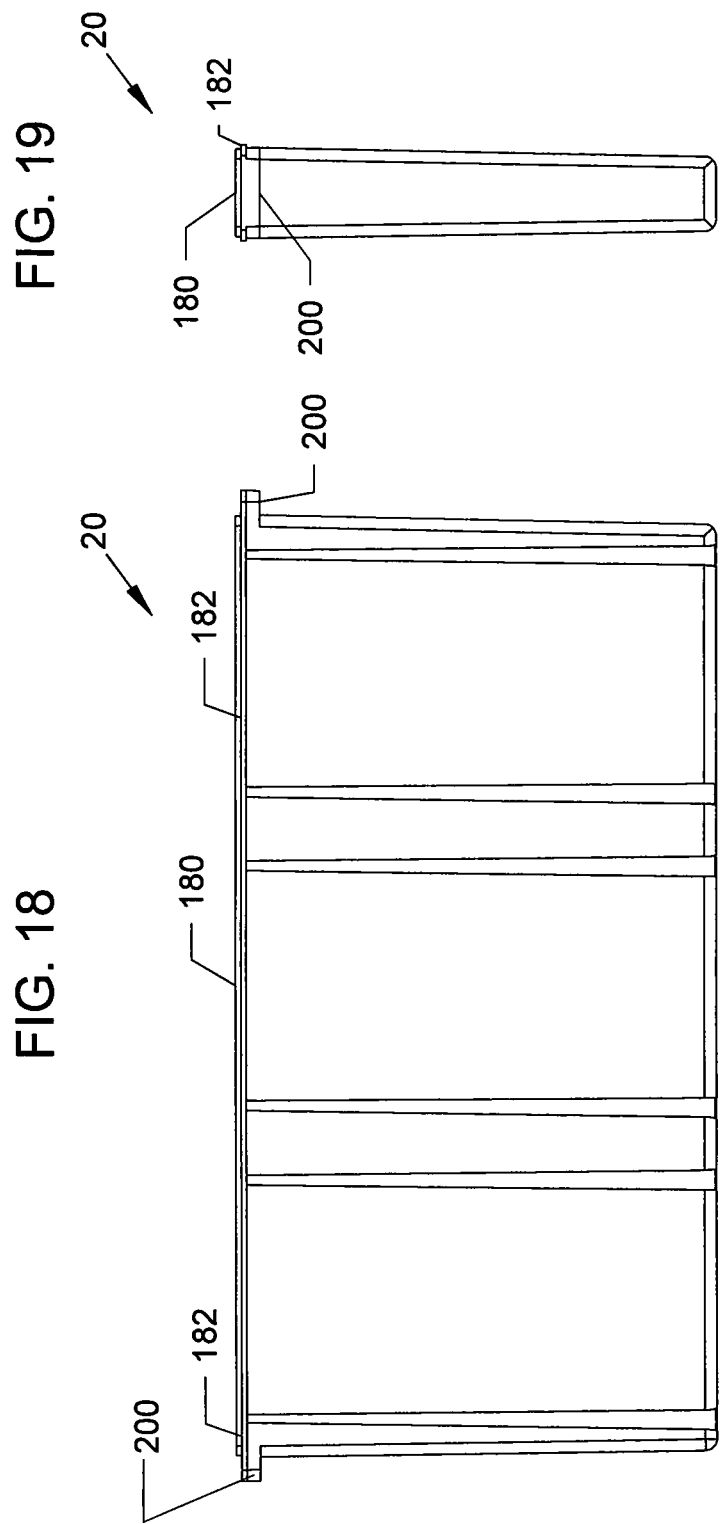

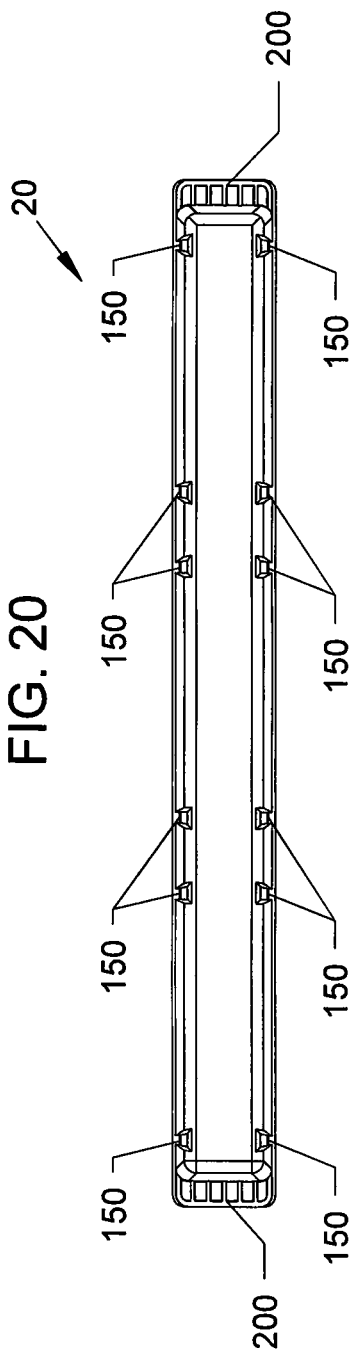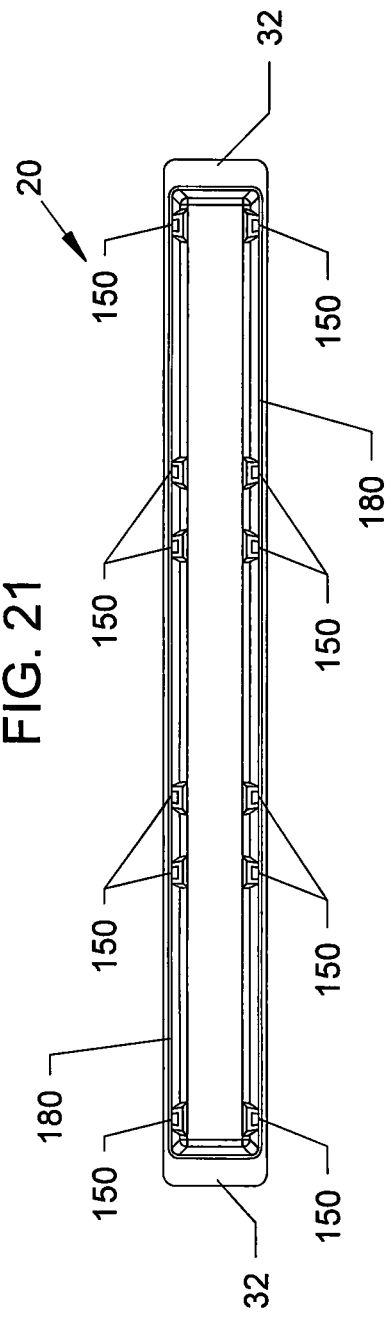

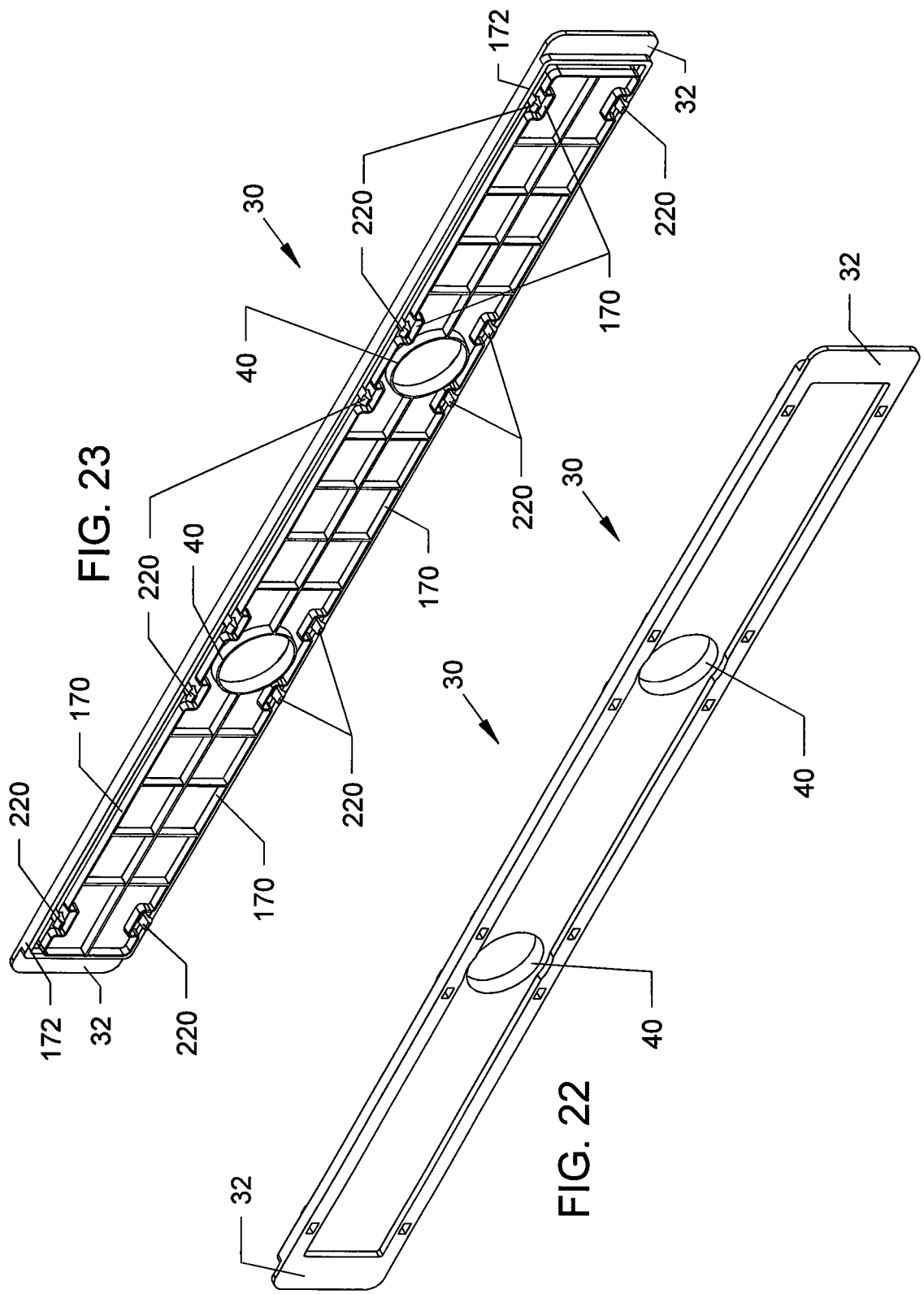

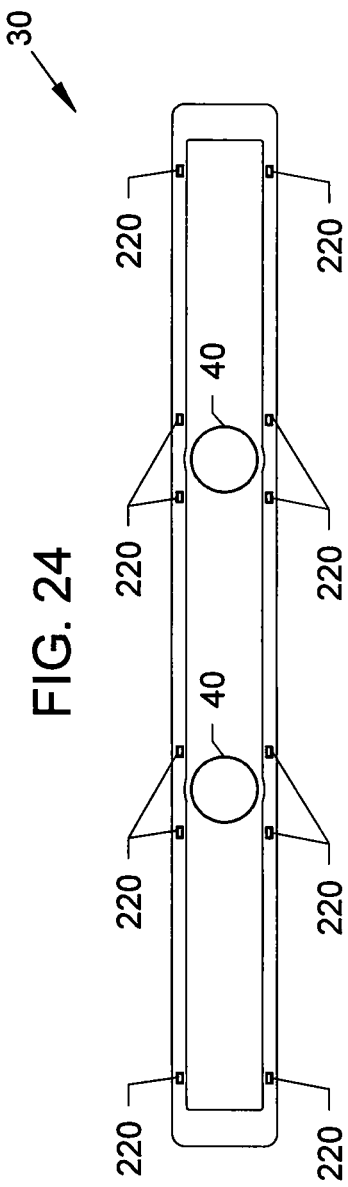
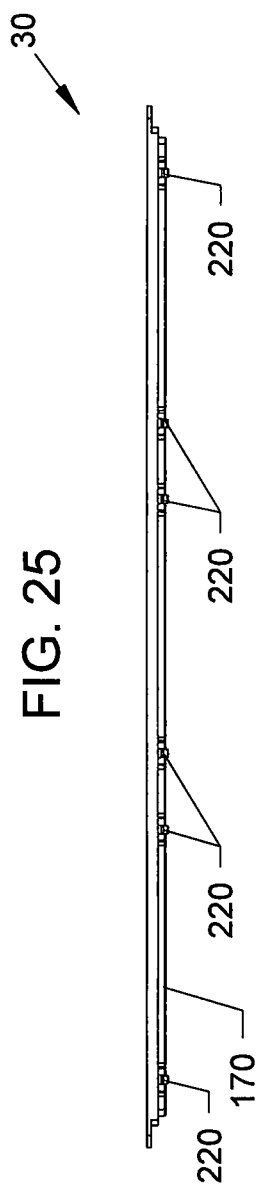
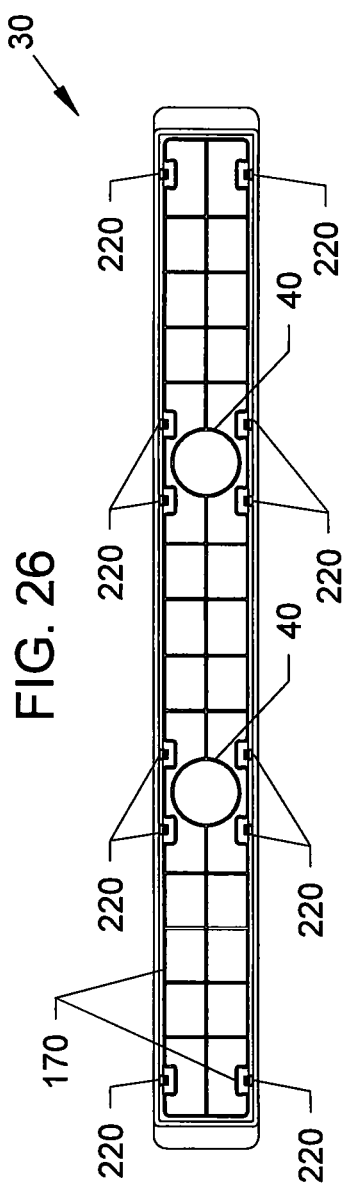

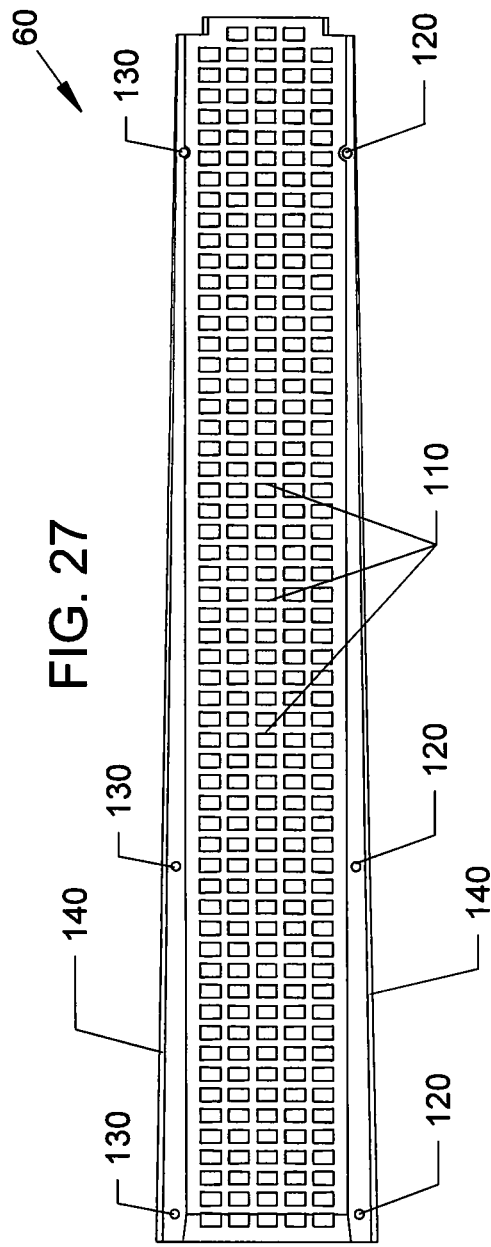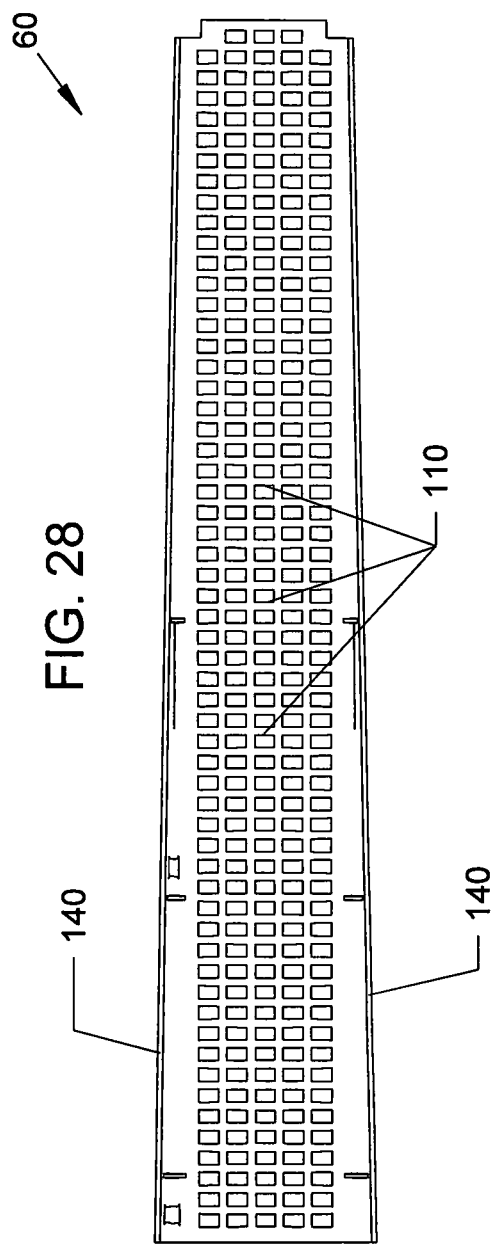

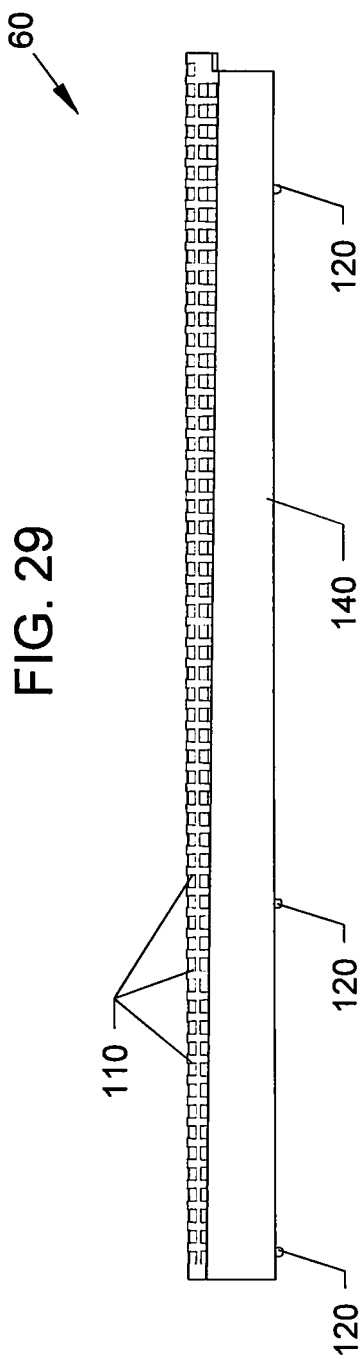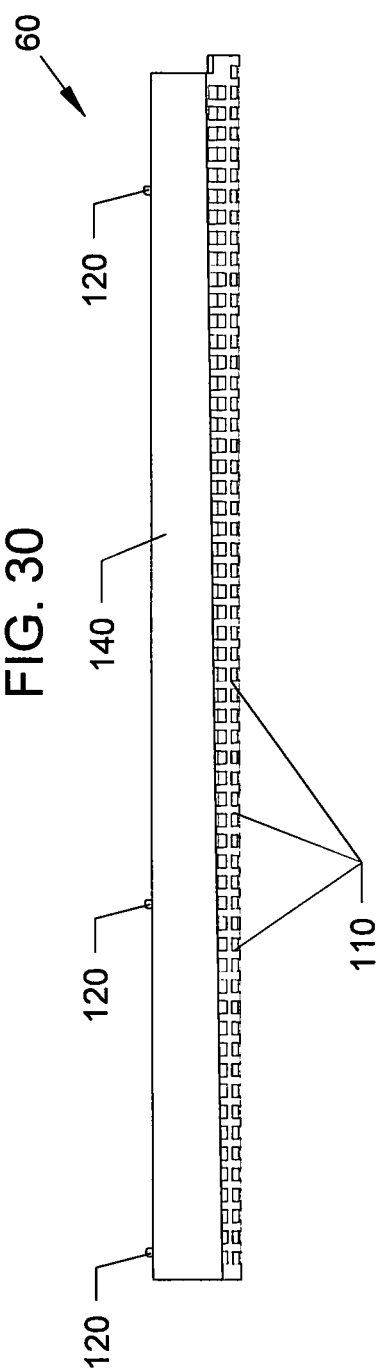

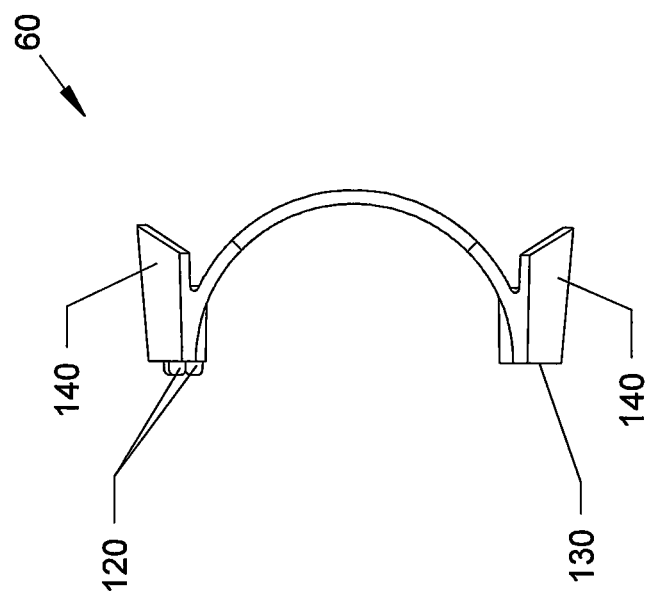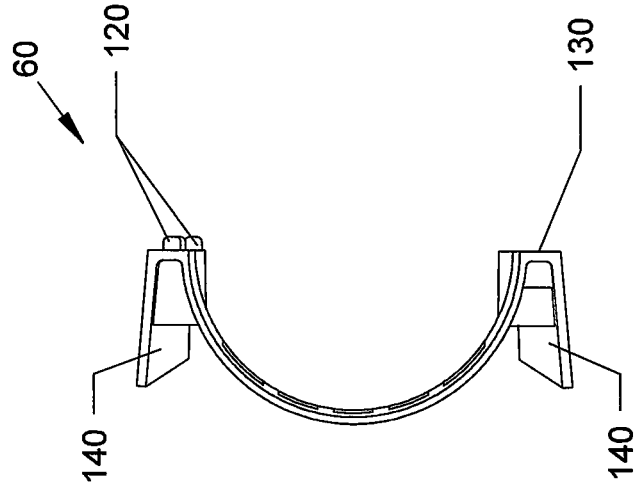

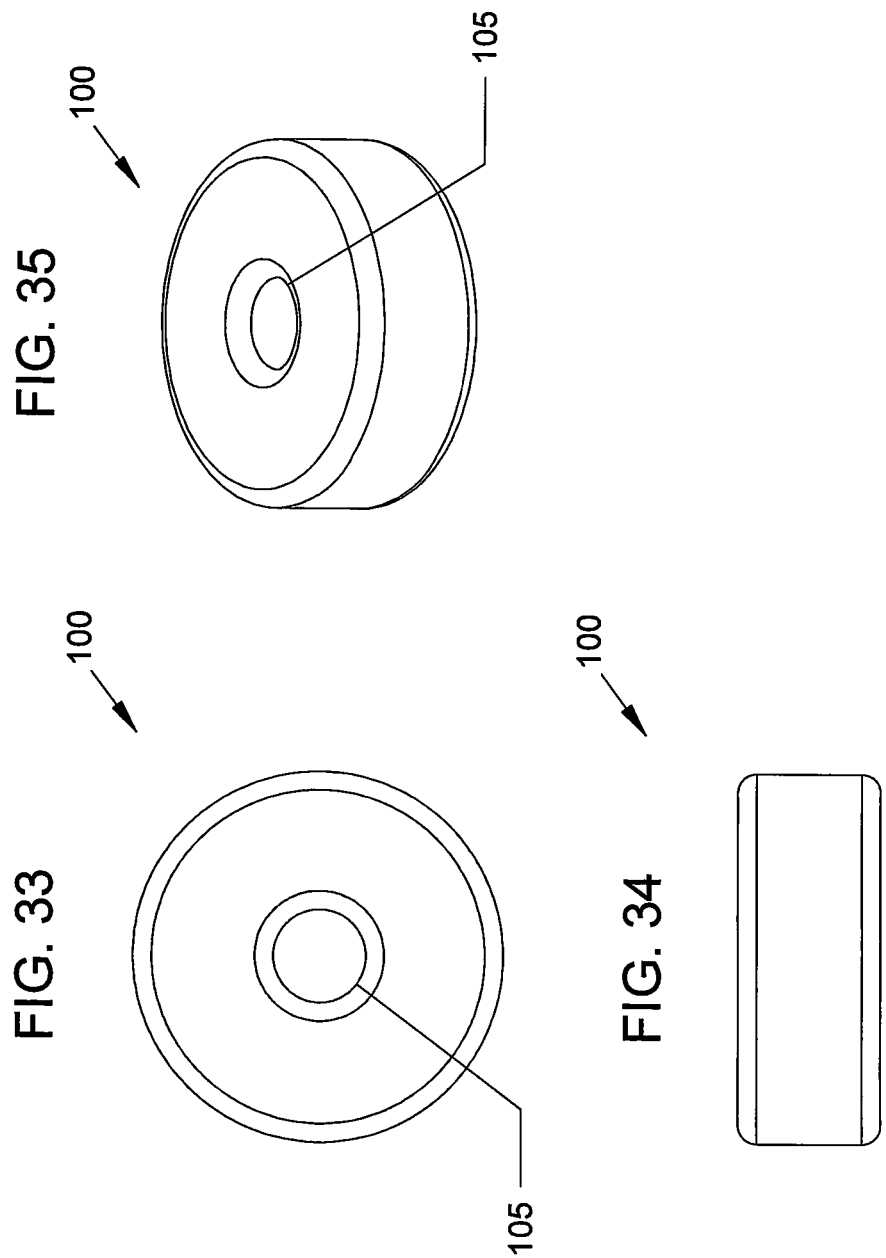

DIVISION BOARD HANGING FEEDER

FIELD OF INVENTION

This invention relates to bee feeders, and in particular to systems, devices, and methods for providing a hanging feeder assembly for a hive box, with a clear lid for monitoring food syrup inside with the lid being easily removed or attached by clip edges to the hanging feeder frame, the feeder having uniform diameter tubes that attach to inner sides of the frame to add stability to the frame, and a float system in the tubes to restrict access to the syrup so that the bees have a safe and easy access to their food supplies.

BACKGROUND AND PRIOR ART

Hanging feeders for bee hive boxes/containers have become popular over the years, but come with many problems. The lids of prior art hanging feeders can be difficult and time consuming to remove and also are usually of an opaque color which prevents the user from seeing the feeding syrup inside of the hanging feeders.

Tubes that exist in hanging feeders generally hang loosely, so that the frames of the hanging feeders are not sturdy and can easily bend and flex against the neighboring comb which can cause damage to the neighboring combs. Such damage can result in preventing access of the bees to the neighboring combs.

Hanging feeders generally hold liquid feeding syrup in hive boxes/containers, where the bees are given constant and continuous interaction with the liquid syrup. As a result, the bees can become fouled with the liquid feed when the liquid feed is being ingested. The sticky feed liquid can stick on the exterior of the bees, which can eventually disable and kill the bees. Also, it is not desirable to let the bees loose to feed on the open supplies of liquid syrup feed supplies. And the bees can easily drown in the liquid syrup.

Thus, the need exists for solutions to the above problems with the prior art.

SUMMARY OF THE INVENTION

A primary objective of the present invention is to provide systems, devices, and methods for providing hanging feeder frame for a hive box, with a clear lid for monitoring food syrup inside with the lid being easily and quickly removed or attached by clip edges to the hanging feeder tank.

A secondary objective of the present invention is to provide systems, devices, and methods for providing hanging feeder frame for a hive box, having uniform diameter tubes that attach to inner sides of the frame to add stability to the hanging feeder tank.

A third objective of the present invention is to provide systems, devices, and methods for providing hanging feeder frame for a hive box, having a float system in the tubes to restrict access to the syrup so that the bees have a safe and easy access to their food supplies, which can limit the bees from consuming too much syrup and/or prevents the bees from drowning in the syrup.

An embodiment of the hanging feeder for a hive, can include a rectangular housing having a separate lid which attaches to and covers an upper open top of the housing, a plurality of identical ladder tubes inside of the housing, each of the tubes having sides that are attached to interior sides of the housing, and liquid feeding syrup inside of the housing.

The hanging feeder can further include a restricting component for restricting access of the bees to the syrup so that bees can safely access the syrup.

The lid can include a transparent portion for allowing outside monitoring of the syrup inside the hanging feeder.

The lid and the upper open end of the housing can include arm members which snap into slots for allowing the lid to easily clippably attach and detach from open top of the housing, and the arm members extend downward from the lid and the slots are in the upper open top of the housing. The arm members can include hook ends that snap into the slots.

Alternatively, the lid and the upper open end of the housing can include arm members which snap into slots for allowing the lid to easily clippably attach and detach from open top of the housing, and the arm members extend upward from the upper open top of the housing and the slots are on the lid. The arm members can include hook ends that snap into the slots.

The hanging feeder can include a pair of downwardly protruding walls underneath the lid which slide about an upwardly protruding wall on top of the housing which prevents spilling of the syrup when the housing with the attached lid are moved.

Alternatively, the hanging feeder can include a pair of upwardly protruding walls on top of the rim of the housing which slide about a downwardly protruding wall underneath the lid which prevents spilling of the syrup when the housing with the attached lid are moved.

Each of the tubes in the hanging feeder can include two longitudinal half sections which together form a single tube.

Each of the tubes can include pins and openings which allow the two longitudinal half sections to attach to one another to form the single tube.

Each of the tubes can include protruding side portions which attach to the inner sides of the housing. The inner sides of the housing can include slots for receiving the protruding side portions of the tubes. Each of the tube half sections can include a side way protruding rib, that when the tube half sections are combined form a dove tail ribs that attach to the inner sides of the housing. The inner sides of the housing can include slots for receiving edges of the dove tail ribs of the combined tube half-sections.

Each of the tubes can include openings along substantially all of the curved side walls of the tubes which form ladder steps adapted for bees to climb in and out of the tubes.

The restricting component can include floats in at least one of the tubes for sitting on the level of the syrup. Each of the floats can include openings for allowing the bees to access the syrup through the floats.

The lid can include openings, and the restricting component covers at least one of the openings in the lid, and the restricting component can be selected from plugs and caps.

Alternatively, the lid can include openings, and the restricting component include any combination of at least one of: plugs for covering at least one of the openings in the lid, caps for covering at least one of the openings in the lid, and floats in at least one of the tubes.

Further objects and advantages of this invention will be apparent from the following detailed description of the presently preferred embodiments which are illustrated schematically in the accompanying drawings.

BRIEF DESCRIPTION OF THE FIGURES

FIG. 3 is a cross-sectional view of the hive box with the hanging bee feeder inside the hive box of FIG. 2 along arrows 3X.

FIG. 4 is an enlarged view of one of the tubes in the hanging feeder of FIG. 3 showing the bee access hole with bee's climbing in and out of the ladder tube for syrup access.

FIG. 5 is a top perspective view of the hanging bee feeder of the preceding figures.

FIG. 6 is a bottom perspective view of the hanging bee feeder of FIG. 5.

FIG. 8A is a front view of the hanging bee feeder of FIGS. 5-7.

FIG. 8B is a side cross-sectional view of the hanging bee feeder of FIG. 8A along arrows 8B that is sectioned through the center of a ladder tube.

FIG. 9 is a top partial cross-sectional view of the hanging bee feeder of FIG. 8A along arrows 9Y highlighting the ladder tube dovetail rib geometry and the syrup tank dovetail slot geometry.

FIG. 10 is a right side view of the hanging bee feeder of FIG. 8A.

FIG. 11 is a left side view of the hanging bee feeder of FIG. 8A.

FIG. 14A is an exploded perspective sectional view of the hanging feeder of FIG. 12 along arrows 14X, which is sectioned through the lid and tank snap geometry. This view and the next highlight the function of the snaps on the lid.

FIG. 14B is an enlarged view of a part of the exploded hanging feeder of FIG. 14A.

FIG. 15A is an assembled perspective sectional view of the hanging feeder of FIG. 12 along arrows 15X with the components snapped together.

FIG. 15B is an enlarged view of a portion of the assembled hanging feeder of FIG. 15A.

FIG. 16 is a top perspective view of the syrup tank of the hanging feeder of the preceding figures with the lid and tubes removed.

FIG. 17 is a bottom perspective of the syrup tank of FIG. 16.

FIG. 18 is a front view of the syrup tank of FIG. 16.

FIG. 19 is a right side view of the syrup tank of FIG. 16.

FIG. 20 is a bottom view of the syrup tank of FIG. 16.

FIG. 21 is a top view of the syrup tank of FIG. 16.

FIG. 22 is a top perspective view of the lid for the hanging feeder of the preceding figures.

FIG. 23 is a bottom perspective view of the lid of FIG. 22.

FIG. 24 is a top view of the lid of FIG. 22.

FIG. 25 is a front side view of the lid of FIG. 22.

FIG. 26 is a bottom view of the lid of FIG. 22.

FIG. 27 is a front view of a ladder tube section used in the hanging feeder of the preceding figures.

FIG. 28 is a rear view of the ladder tube section of FIG. 27.

FIG. 29 is a top view of the ladder tube section of FIG. 27.

FIG. 30 is a bottom view of the ladder tube section of FIG. 27.

FIG. 31 is a left side view of the ladder tube section of FIG. 27.

FIG. 32 is a right side view of the ladder tube section of FIG. 27.

FIG. 33 is an enlarged top view of the ladder tube float used in the ladder tubes of the hanging feeder of the preceding figures.

FIG. 34 is a front view of the ladder tube float of FIG. 33.

FIG. 35 is a perspective view of the ladder tube float of FIG. 33.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Hanging feeder assembly.
20 Hanging feeder syrup tank.
30 Hanging feeder lid.
32 End extending tab edges
40 Bee access hole in lid.
50 Ladder tube/Ladder tube assembly.
60 Ladder tube section.
65 Access hole plug.
70 Hanging hive box.
80 Hanging frame.
90 Feeding syrup.
100 Ladder tube float.
105 Hole in float for bee access to syrup.
110 Ladder tube steps for bee to climb.
120 Ladder tube alignment pins align the tube halves at assembly.
130 Ladder tube alignment holes
140 Ladder dovetail ribs form a complete dovetail profile when the tube halves are assembled.
150 Feeder tank dovetail slots receive the dovetail profiles on the ladder tube assemblies to secure the tubes into the tank.
170 Anti-spill feature on the lid.
180 Anti-spill feature on the tank.
190 Hanging ledge in hive box (prior art).

200 Hanging boss on syrup tank.
210 Bee.
220 Snap arms on lid engage snap cutouts on tank to secure lid to tank.
230 Snap cutout on tank receives snap arm to secure lid to tank.

Figure 1:
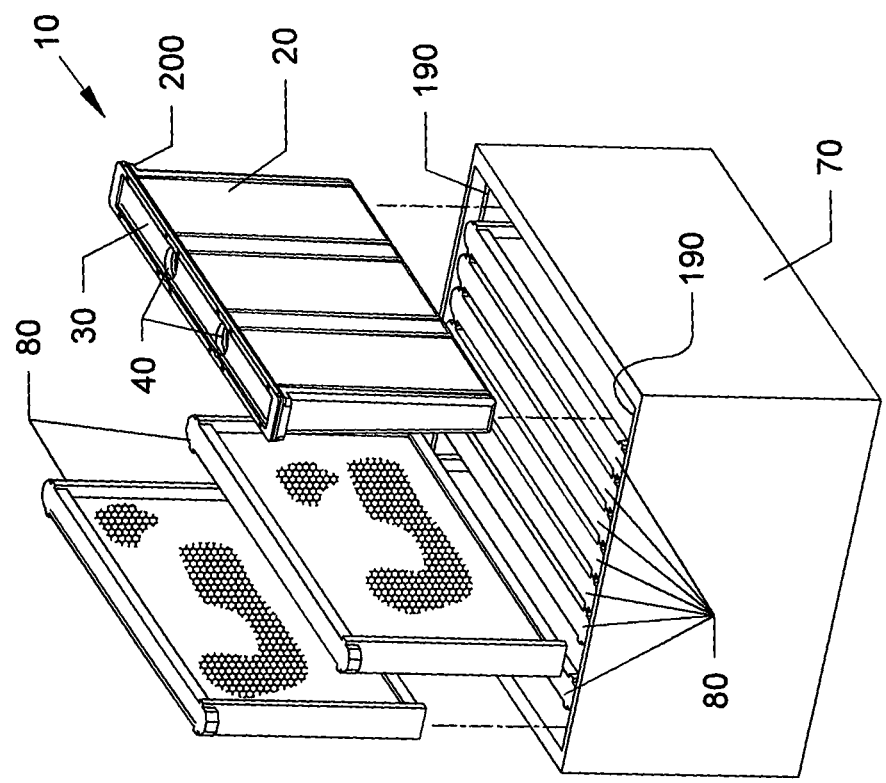
FIG. 1 is a top perspective of a hive box with hanging frames inserted and ready to be inserted into the hive box along with the novel hanging bee feeder.
Figure 2:
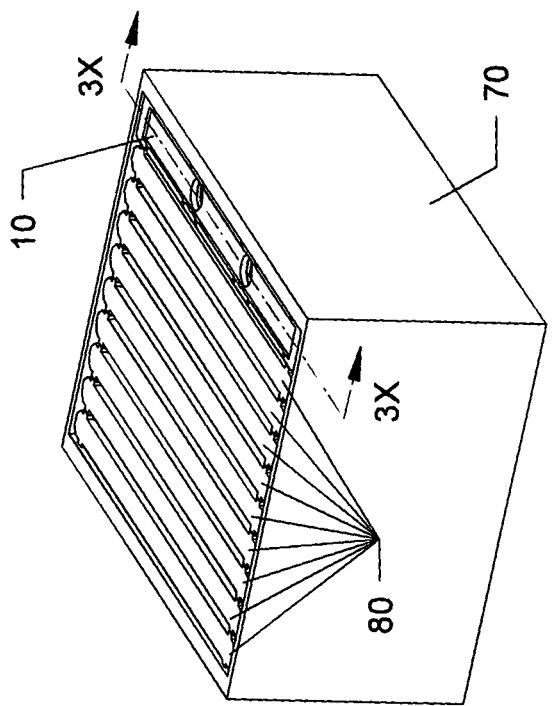
FIG. 2 shows the hanging hives and novel hanging bee feeder of FIG. 1 with the hives and the hanging bee feeder inserted into the hive box.

FIG. 1 is a top perspective of a hive box 70 with hanging frames 80 inserted and ready to be inserted into the hive box 70 along with the novel hanging bee feeder assembly 10. FIG. 2 shows the hanging frames 80 and novel hanging bee feeder assembly 10 of FIG. 1 with the hanging frames 80 and the hanging bee feeder assembly 10 inserted into the hive box 70.

FIG. 3 is a cross-sectional view of the hive box 70 with the hanging bee feeder assembly 10 inside the hive box 70 of FIG. 2 along arrows 3X.

FIG. 4 is an enlarged view of one of the tubes 50 each formed from 2 ladder tube sections 60 in the hanging feeder assembly 10 of FIG. 3 showing the bee access hole 40 in the lid 30 with bees 210 climbing in and out of the ladder tube formed from sections 60 on the ladder tube steps 110 for access to and from the feeding syrup 90.

FIG. 5 is a top perspective view of the hanging bee feeder assembly 10 of the preceding figures. FIG. 6 is a bottom perspective view of the hanging bee feeder assembly 10 of FIG. 5.

Figure 7:
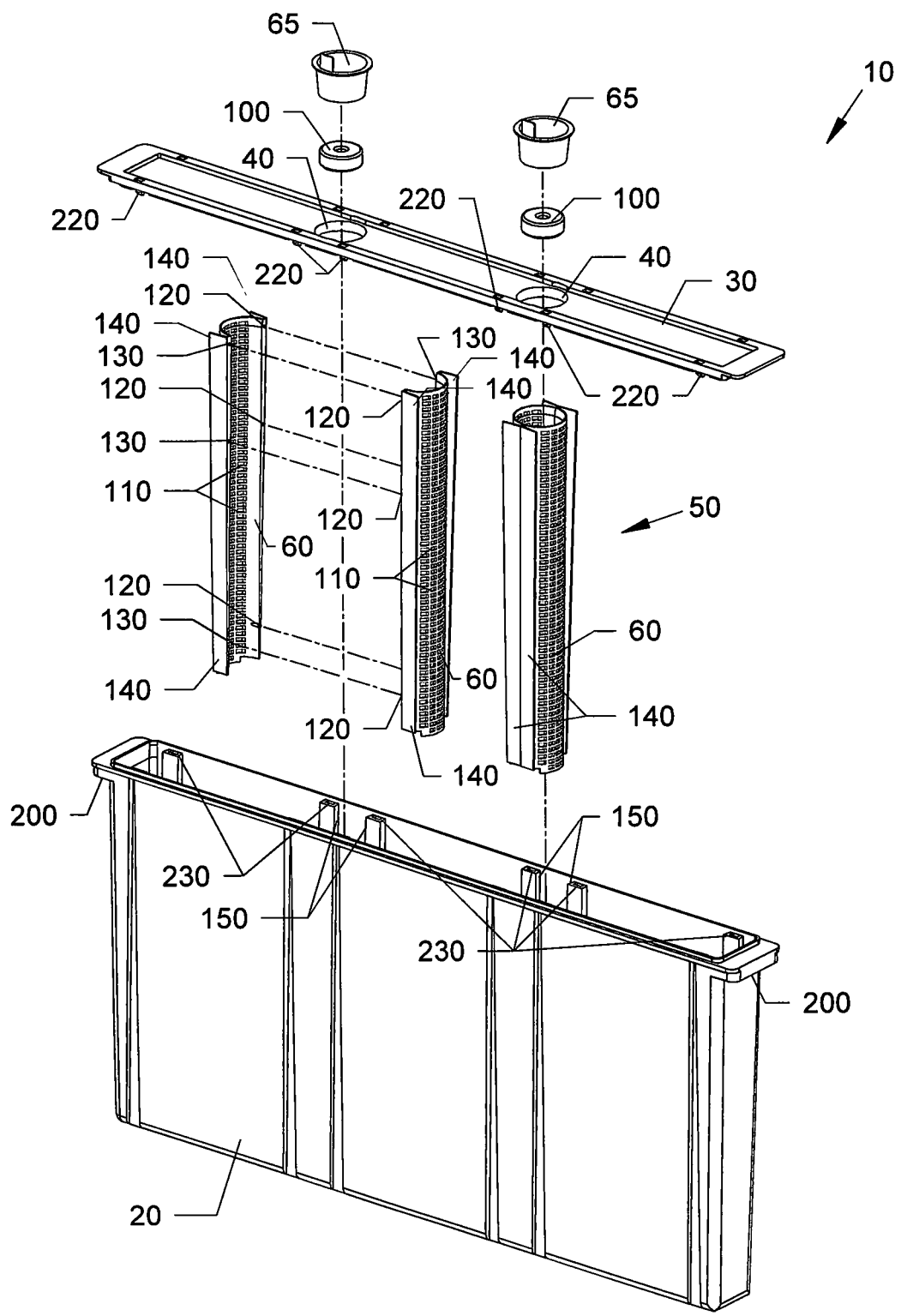
FIG. 7 is an exploded view of the hanging bee feeder of FIG. 5.

FIG. 7 is an exploded view of the hanging bee feeder assembly 10 of FIG. 5 with each ladder tube 50 in separate tube sections 60, lid 30, floats 100 and access hole plugs 65. FIG. 8A is a front view of the hanging bee feeder assembly 10 of FIGS. 5-7. FIG. 8B is a side cross-sectional view of the hanging bee feeder assembly 10 of FIG. 8A along arrows 8B that is sectioned through the center of a ladder tube formed from 2 ladder tube sections 60.

FIG. 9 is a top partial cross-sectional view of the hanging bee feeder assembly 10 of FIG. 8A along arrows 9Y highlighting the ladder tube dovetail ribs 140 each of the ladder tube sections 60 and the syrup tank dovetail slots 150.

Figure 12:
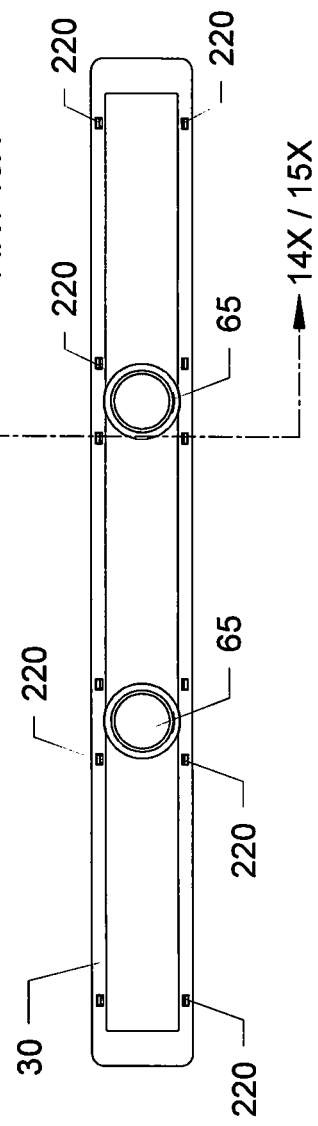
FIG. 12 is a top view of the hanging bee feeder of FIGS. 8A and 10-11.
Figure 13:
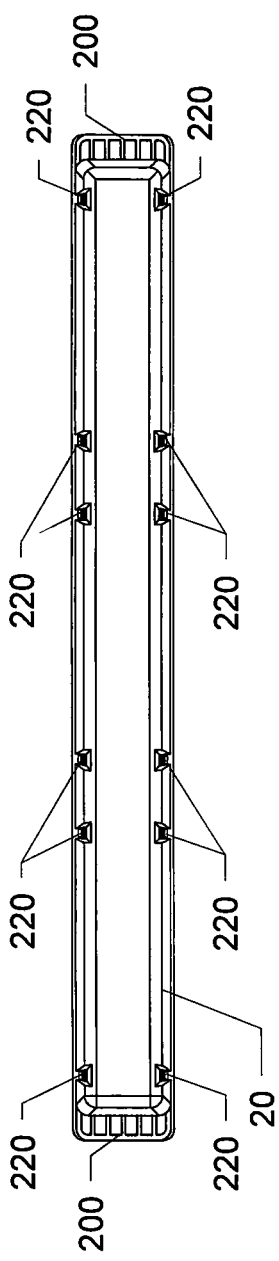
FIG. 13 is a bottom view of the hanging bee feeder of FIGS. 8A and 10-11.

FIG. 10 is a right side view of the hanging bee feeder assembly 10 of FIG. 8A. FIG. 11 is a left side view of the hanging bee feeder assembly 10 of FIG. 8A. FIG. 12 is a top view of the hanging bee feeder assembly 10 of FIGS. 8A and 10-11. FIG. 13 is a bottom view of the hanging bee feeder assembly 10 of FIGS. 8A and 10-11.

FIG. 14A is an exploded perspective sectional view of the hanging feeder assembly 10 of FIG. 12 along arrows 14X, which is sectioned through the lid 30 and tank snap geometry. This view and the next highlight the function of the snaps 220, 230 on the lid 30. FIG. 14B is an enlarged view of a part of the exploded hanging feeder assembly 10 of FIG. 14A.

FIG. 15A is an assembled perspective sectional view of the hanging feeder assembly 10 of FIG. 12 along arrows 15X with the components 220, 230 snapped together. FIG. 15B is an enlarged view of a portion of the assembled hanging feeder 10 of FIG. 15A.

FIG. 16 is a top perspective view of the syrup tank 20 of the hanging feeder assembly 10 of the preceding figures with the lid 30 and tubes 50 removed. FIG. 17 is a bottom perspective of the syrup tank 20 of FIG. 16. FIG. 18 is a front view of the syrup tank 20 of FIG. 16. FIG. 19 is a right side view of the syrup tank 20 of FIG. 16. FIG. 20 is a bottom view of the syrup tank 20 of FIG. 16. FIG. 21 is a top view of the syrup tank 20 of FIG. 16.

FIG. 22 is a top perspective view of the lid 30 for the hanging feeder assembly 10 of the preceding figures. FIG. 23 is a bottom perspective view of the lid 30 of FIG. 22. FIG. 24 is a top view of the lid 30 of FIG. 22. FIG. 25 is a front side view of the lid 30 of FIG. 22. FIG. 26 is a bottom view of the lid 30 of FIG. 22.

FIG. 27 is a front view of a ladder tube section 60 used in the hanging feeder assembly 10 of the preceding figures. FIG. 28 is a rear view of the ladder tube section 60 of FIG. 27. FIG. 29 is a top view of the ladder tube section 60 of FIG. 27. FIG. 30 is a bottom view of the ladder tube section 60 of FIG. 27. FIG. 31 is a left side view of the ladder tube section 60 of FIG. 27. FIG. 32 is a right side view of the ladder tube section 60 of FIG. 27.

FIG. 33 is an enlarged top view of the ladder tube float 100 used in the ladder tubes 50 of the hanging feeder assembly 10 of the preceding figures. FIG. 34 is a front view of the ladder tube float 100 of FIG. 33. FIG. 35 is a perspective view of the ladder tube float 100 of FIG. 33.

Lid 30

Referring to FIGS. 1-8, 10-12, 14A-17, 21 and 23-26, the lid 30 can be made from a plastic material and the like, that can be preferably transparent so as to allow the user to be able to monitor the level of feeding syrup 90 inside the syrup tank 20. The lid 30 can be attached to the top of the syrup tank 20. When the lid 30 is pushed down on top of syrup tank 20, downwardly protruding snap arms 220 with lower outwardly protruding hook ends bend can back and snap into mateable cut-outs along the upper inside walls of the tank 20. In the closed position, the lid 30 is firmly attached to the top of the syrup tank 20 with the end extending tab edges 32 on the lid generally pressed against the upper end boss edges 200 on the syrup tank 20.

Pulling the lid 30 upward by end extending tab edges 32 on the lid 30 detach the lid 30 from the top of the syrup tank 20. As such, the lid 30 can be easily and quickly removed or attached by these snapable clip edges to the hanging feeder tank 20.

Referring to FIGS. 3-5, 7-8B, 10-12, 14A-15B, the lid 20 can include a plurality of access holes 40 that are located over the tubes/tube assemblies 50 that provide access points for the bees 210 to access the tubes/tube assemblies 50 and the feeding syrup 90. The access holes 40 can be generally circular in shape. Plugs 65 having upper pull tabs can be placed into the holes 40 to close off access to the syrup 90 when the hanging feeder assembly 10 is not being used.

Plugs 65 can be formed from any material, such as but not limited to wood, cork, plastic, foam, and the like.

During use, one hole 40 can be unplugged allowing access to the unplugged hole 40. Alternatively, all of the holes 40 can be unplugged to allow more access into the feeding assembly 10.

Underneath the lid 30 can be two downwardly protruding walls 170, 172 (FIG. 14B, 15B, 23) with a channel formed between running generally about adjacent to the perimeter of the lid 30. The inner perimeter wall 172 can hang lower than the outer perimeter wall 170.

Extending upward from a rim 182 FIGS. 14B, 15B, 16, 18-19 on the top of the tank 20 can be a raised wall 180 which rises upward from the rim 182.

When the lid 30 is attached to the tank 20, the downwardly protruding walls 170, 172 under the lid 20 sandwich about the raised wall 180 on top of the rim 182 of the tank 20 with a friction type fit forming an anti-spill feature where the syrup 90 inside the tank 20 is prevented from easily spilling out of the tank 20 when the tank 20 is being moved.

Tubes/Tube Assemblies 50

Referring to FIGS. 3, 4, 7, 8B, 9, 14A-16, and 27-32, the hanging feed assembly 10 can include a plurality of tubes/ tube assemblies 50 mounted inside the syrup tank 20. Each of the tubes/tube assemblies 50 can include a pair of identical tube half sections 60 that each have generally half circle walls with cut-outs along most of the curved wall surfaces that form ladder tube steps 110 which are used for the bees 210 to climb into and out of the tubes/tube assemblies 50. The half sections 60 can include alignment pins 120 and alignment holes 130 that mate together as male and female connectors when the halves 60 are pressed together and from individual tubes/tube assemblies 50. Running along both edges of the half sections 60 can be ribs 140 so that when a pair of half sections 60 connect together, the ribs 140 together form dove tails with outer free edges.

Referring to FIG. 9, an assembled tube assembly 50 can then be lifted to be above the open top of the tank 20, and oriented so that the dovetail slots 150 on the inner walls of the tank 20 can receive the outer edges of the dove tails 140 therein, and the tube assembly 50 can be slid down into the tank 20 until the bottom of the tube assembly 50 abuts against the floor of the tank 20. The dove tails 140 and slots 150 can form tight fits so that the tube assemblies 50 do not move when they are inserted inside of the tank 20. This assembly and insertion process can continue until all of the tube assemblies 50 are inserted into the tank 20. When the tubes/tube assemblies 50 are all inside of the tank 20, the hanging feeder assembly 10 is very sturdy and stable since both sides of each of the tubes/tube assemblies 50 are not directly attached to the tank 20.

This novel attachment technique for attaching the sides of the tubes/tube assemblies to the inner walls of the tank helps prevent the side walls of the tank 20 from bowing outward or inward when the hanging feeder 10 is either outside or inside of the hanging hive box 70 shown in FIGS. 1-2. When assembled the hanging boss 200 on the syrup tank can rest on the hanging ledge inside the upper opening of the hive box 70 as shown in FIGS. 1-3.

Referring to FIGS. 3, 4, 7, 8B, 33-34, each of the tubes/tube assemblies 50 can include a float 100, such as but not limited to a closed cell foam disc, plastic, wood, cork, and the like, that can have a generally disc shape, with a central hole 105 therethrough. After the tank 20 is with the assembled tubes/tube assemblies 50 are attached inside and the tank 20 is filled with syrup, each of the float(s) 100 can be placed in each of the tubes/tube assemblies 50 and placed on top of the syrup 90 so that the float(s) 100 are buoyant enough to float on top the upper level of syrup 90. The holes 105 in the float(s) 100 are small enough to limit access to the upper level of the syrup 90. The combination of the ladder tube steps 110 and small hole 105 limit access to the bees 210 so as to help the bees 210 feed adequately on the syrup without drowning in the syrup 90.

The floats 100 and the plugs 65 are not required to be used. The plugs 65 and the floats 100 can be used in any combination to control access of the bees to the syrup.

The novel feeder assembly components can be formed from moldable plastic materials, such as but not limited to polypropylene, polyethylene, combinations thereof, and the like.

The walls of the tank 20 can also be transparent so that the syrup level can be monitored and replenished when needed.

While the anti-spill feature shows a pair of downwardly protruding walls under the lid which slides about an upwardly protruding wall on top of the tank, the invention can be practiced with the anti-spill components switched. A pair of upwardly protruding walls can be located on top of the rim of the housing which slide about a downwardly protruding wall underneath the lid which also prevents spilling of the syrup when the housing with the attached lid are moved.

Although the drawings show arm members extending down from the bottom of the lid into slots on the open end of the tank, the arm members can extend upward from the tank into slots under the lid. Additionally, the lid can include alternating arms and slots with the tank having mateable alternating slots and arms.

While each tube assembly has two dove tail profiles, each with a pair of outwardly extending ribs, the invention can work with single extending ribs on both outer sides of the tube assemblies, and have other fastening arrangements.

Although the tubes 50 are shown as being generally cylindrical, the tubes can have other geometric shapes, such as but not limited to square, rectangular, triangular shaped, and the like.

While plugs 65 are described, the openings in the lid 30 can be closed with other components, such as but not limited to caps, and the like, where the caps can be made of any material, such as but not limited to plastic, foam, wood, cork, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A hanging feeder assembly for insertion alongside a plurality of honeycomb frames in a portable hive, comprising:
   a rectangular feeder tank having a pair of substantially vertical opposing sidewalls joined at each end by a pair of substantially vertical opposing end walls and a substantially horizontal bottom panel joining lower edges of the sidewalls and endwalls;
   a separate lid which attaches to and covers an upper open top of the feeder tank;
   one or more ladder tubes inside of the feeder tank, an outer wall of each of the tubes being in direct contact with interior surfaces of both of said opposing sidewalls of the feeder tank.

2. The hanging feeder of claim 1, further comprising:
   a restricting component for restricting access of the bees to the syrup so that bees can safely access the syrup.

3. The hanging feeder of claim 1, wherein the lid includes:
   a transparent portion for allowing outside monitoring of the syrup inside the hanging feeder.

4. The hanging feeder of claim, 1, wherein the lid and the upper open end of the feeder tank includes: arm members which snap into slots for allowing the lid to easily clippably attach and detach from open top of the feeder tank, and the arm members extend downward from the lid and the slots are in the upper open top of the feeder tank.

5. The hanging feeder of claim 4, wherein the arm members include hook ends that snap into the slots.

6. The hanging feeder of claim, 1, wherein the lid and the upper open end of the feeder tank includes: arm members which snap into slots for allowing the lid to easily clippably attach and detach from open top of the feeder tank, and the arm members extend upward from the upper open top of the feeder tank and the slots are on the lid.

7. The hanging feeder of claim 6, wherein the arm members include hook ends that snap into the slots.

8. The hanging feeder of claim 1, further comprising:
a pair of downwardly protruding walls underneath the lid which slide about an upwardly protruding wall on top of the feeder tank which prevents spilling of the syrup when the feeder tank with the attached lid are moved.

9. The hanging feeder of claim 1, further comprising:
a pair of upwardly protruding walls on top of the rim of the feeder tank which slide about a downwardly protruding wall underneath the lid which prevents spilling of the syrup when the feeder tank with the attached lid are moved.

10. The hanging feeder of claim 1, wherein each of the tubes include two longitudinal half sections which together form a single tube.

11. The hanging feeder of claim 10, further comprising: pins and openings which allow the two longitudinal half sections to attach to one another to form the single tube.

12. The hanging feeder of claim 1, wherein each of the tubes include protruding side portions which attach to the inner sides of the feeder tank.

13. The hanging feeder of claim 12, wherein the inner sides of the feeder tank include slots for receiving the protruding side portions of the tubes.

14. The hanging feeder of claim 13, wherein each of the tube half sections include a side way protruding rib, that when the tube half sections are combined form a dove tail ribs that attach to the inner sides of the feeder tank.

15. The hanging feeder of claim 14, wherein the inner sides of the feeder tank include slots for receiving edges of the dove tail ribs of the combined tube half sections.

16. The hanging feeder of claim 14, wherein each of the tubes includes: openings along substantially all of the curved side walls of the tubes which form ladder steps adapted for bees to climb in and out of the tubes.

17. The hanging feeder of claim 2, wherein the restricting component includes: floats in at least one of the tubes for sitting on the level of the syrup.

18. The hanging feeder of claim 17, wherein each of the floats includes: openings for allowing the bees to access the syrup through the floats.

19. The hanging feeder of claim 2, wherein the lid includes openings, and the restricting component covers at least one of the openings in the lid, and the restricting component is selected from plugs and caps.

20. The hanging feeder of claim 2, wherein the lid includes openings, and the restricting component includes a combination of at least one of: plugs for covering at least one of the openings in the lid, caps for covering at least one of the openings in the lid, and floats in at least one of the tubes.

* * * * *